(12) United States Patent
Grusin

(10) Patent No.: US 10,953,430 B2
(45) Date of Patent: Mar. 23, 2021

(54) APPLICATORS FOR APPLYING MASKING MATERIAL TO SURFACES

(71) Applicant: Seth Grusin, Beaverton, OR (US)

(72) Inventor: Seth Grusin, Beaverton, OR (US)

(\*) Notice: Subject to any disclaimer, the term of this patent is extended or adjusted under 35 U.S.C. 154(b) by 0 days.

(21) Appl. No.: 16/404,913

(22) Filed: May 7, 2019

(65) Prior Publication Data
US 2019/0337010 A1 Nov. 7, 2019

Related U.S. Application Data

(60) Provisional application No. 62/667,766, filed on May 7, 2018.

(51) Int. Cl.
| | |
|---|---|
| *B29C 65/00* | (2006.01) |
| *B05C 21/00* | (2006.01) |
| *B65H 16/00* | (2006.01) |
| *B29C 65/78* | (2006.01) |
| *B29C 65/50* | (2006.01) |
| *B29C 65/48* | (2006.01) |
| *B29C 65/76* | (2006.01) |

(52) U.S. Cl.
CPC ......... *B05C 21/005* (2013.01); *B65H 16/005* (2013.01); *B29C 65/48* (2013.01); *B29C 65/50* (2013.01); *B29C 65/5042* (2013.01); *B29C 65/5092* (2013.01); *B29C 65/76* (2013.01); *B29C 65/7802* (2013.01); *B29C 65/7841* (2013.01); *B29C 65/7894* (2013.01); *B29C 65/7897* (2013.01); *B29C 66/1122* (2013.01); *B29C 66/41* (2013.01); *B29C 66/43* (2013.01); *B29C 66/435* (2013.01); *B29C 66/472* (2013.01); *B29C 66/4722* (2013.01); *B29C 66/81* (2013.01); *B29C 66/81461* (2013.01)

(58) Field of Classification Search
CPC ..... B29C 65/48; B29C 65/50; B29C 65/5042; B29C 65/5092; B29C 65/76; B29C 65/7802; B29C 65/7841; B29C 65/7894; B29C 65/7897; B29C 66/1122; B29C 66/41; B29C 66/43; B29C 66/435; B29C 66/472; B29C 66/4722; B29C 66/81; B29C 66/81461
USPC ......... 156/71, 297, 324, 502, 538, 544, 549, 156/560, 577, 579
See application file for complete search history.

(56) References Cited

U.S. PATENT DOCUMENTS

| | | | |
|---|---|---|---|
| 3,871,940 A | * | 3/1975 | Antonioni ................. B05C 9/10 156/353 |
| 4,263,347 A | * | 4/1981 | Banta ...................... E04G 21/30 427/282 |

(Continued)

*Primary Examiner* — Mark A Osele
*Assistant Examiner* — Nickolas R Harm

(57) ABSTRACT

Applicators for applying a masking material to a target surface, the applicators include a body, an applicator system attached to the body and configured to apply the masking material to the target surface with a substantially straight edge as the body is translated in an application direction, a dispenser system attached to the body, the dispenser system being configured to support a supply of the masking material and to dispense the masking material to the applicator system, and a guide member attached to the body proximate the applicator system in a trailing position and configured to press the masking material to the target surface after the applicator system applies the masking material to the target surface.

17 Claims, 10 Drawing Sheets

(56) References Cited

U.S. PATENT DOCUMENTS

| | | | | |
|---|---|---|---|---|
| 4,906,322 A * | 3/1990 | Hollier | B65H 35/004 | 156/527 |
| 4,913,767 A * | 4/1990 | Longworth | B21D 53/64 | 156/527 |
| 4,981,537 A * | 1/1991 | Heil | B65H 35/004 | 156/157 |
| 5,037,501 A * | 8/1991 | Lawson | B65H 35/004 | 156/527 |
| 5,113,921 A * | 5/1992 | Pool | B05B 12/24 | 156/71 |
| 5,445,703 A * | 8/1995 | Steeves | B65H 35/004 | 156/527 |
| 5,628,866 A * | 5/1997 | Pool | B65H 35/004 | 156/527 |
| 5,667,626 A * | 9/1997 | Cayford | B65H 35/004 | 156/577 |
| 5,775,624 A * | 7/1998 | Huerta | B65H 23/08 | 156/577 |
| 6,039,102 A * | 3/2000 | Sadrakula | B65H 35/004 | 156/510 |
| 6,887,553 B1 * | 5/2005 | Heil | B65H 18/28 | 428/121 |
| 7,621,309 B1 * | 11/2009 | Mondloch | B44C 7/06 | 156/526 |
| 7,921,896 B2 * | 4/2011 | Andersen | B65H 35/004 | 156/527 |
| 8,297,327 B2 * | 10/2012 | Hardy | B65H 35/0033 | 156/510 |
| 9,150,377 B2 * | 10/2015 | Gibson | B65H 35/004 | |
| 9,365,384 B2 * | 6/2016 | Thompson | B65H 35/004 | |
| 2002/0185234 A1 * | 12/2002 | Matechuk | B65H 35/0033 | 156/577 |
| 2005/0100386 A1 * | 5/2005 | Murray | B05C 17/005 | 401/5 |
| 2008/0156444 A1 * | 7/2008 | Pitzen | B32B 3/06 | 156/510 |
| 2009/0324879 A1 * | 12/2009 | Anderson | B65H 35/004 | 428/121 |
| 2011/0297326 A1 * | 12/2011 | Jungklaus | B25G 1/10 | 156/538 |
| 2013/0020029 A1 * | 1/2013 | Lazar | B65H 35/004 | 156/527 |
| 2013/0205530 A1 * | 8/2013 | Dale | B05C 17/02 | 15/230.11 |
| 2014/0090785 A1 * | 4/2014 | Nguyen | B65H 35/004 | 156/516 |
| 2019/0010713 A1 * | 1/2019 | Negri | E04F 21/1652 | |

* cited by examiner

APPLICATORS FOR APPLYING MASKING MATERIAL TO SURFACES

CROSS REFERENCE TO RELATED APPLICATIONS

This application claims priority to U.S. application, Ser. No. 62/667,766, filed on May 7, 2018, which is hereby incorporated by reference for all purposes.

BACKGROUND

The present disclosure relates generally to applicators. In particular, applicators for applying masking material to surfaces are described.

Painting is an important part of any construction project, whether it is a new build or remodel. Paint protects the walls from moisture and damage while improving the aesthetics of the building itself. For these reasons, it is important to do a high quality paint job and cover an entire surface area, but in the least amount of time. Prior to most paint jobs, preparation work is done to protect other walls, surfaces, and objects that are not intended to be painted the same color as another area.

Presently, a masking process is done to delineate areas to be painted and areas to be protected from the paint being applied. The typical masking process involves adhering either paper or plastic to a surface or edge using tape. The masking process can be tedious and laborious and is usually performed by hand. Someone performing the masking preparation work must bend over or get on all four limbs to mask a floor or low area, and often, ladders or stilts are necessary to mask off a ceiling or high place.

Some hand tools have made the application of masking materials easier, whereby they dispense the tape and paper or plastic at the same time for the user. However, this process is still done exclusively by hand and is not sufficiently accurate or effective. Currently, there is not an automatic or mechanical tool to apply masking material to walls or surfaces that applies the masking material in an adequately straight line, or which does so quickly without straining the person applying the masking material.

Conventional masking material applicators are generally unable to manage corners effectively or seamlessly. Known applicators must generally stop applying masking material upon reaching a corner and then restart applying masking material anew on the adjacent wall. This stopping and starting is inefficient, and it would be desirable to have a device enabling seamless or continuous transitions between adjacent walls over corners.

Thus, there exists a need for masking material applicators that improve upon and advance the design of known masking applicators. Examples of new and useful masking material applicators relevant to the needs existing in the field are discussed below.

SUMMARY

The present disclosure is directed to applicators for applying a masking material to a target surface, the applicators include a body, an applicator system attached to the body and configured to apply the masking material to the target surface with a substantially straight edge as the body is translated in an application direction, a dispenser system attached to the body, the dispenser system being configured to support a supply of the masking material and to dispense the masking material to the applicator system, and a guide member attached to the body proximate the applicator system in a trailing position and configured to press the masking material to the target surface after the applicator system applies the masking material to the target surface.

DETAILED DESCRIPTION

Figure 1:
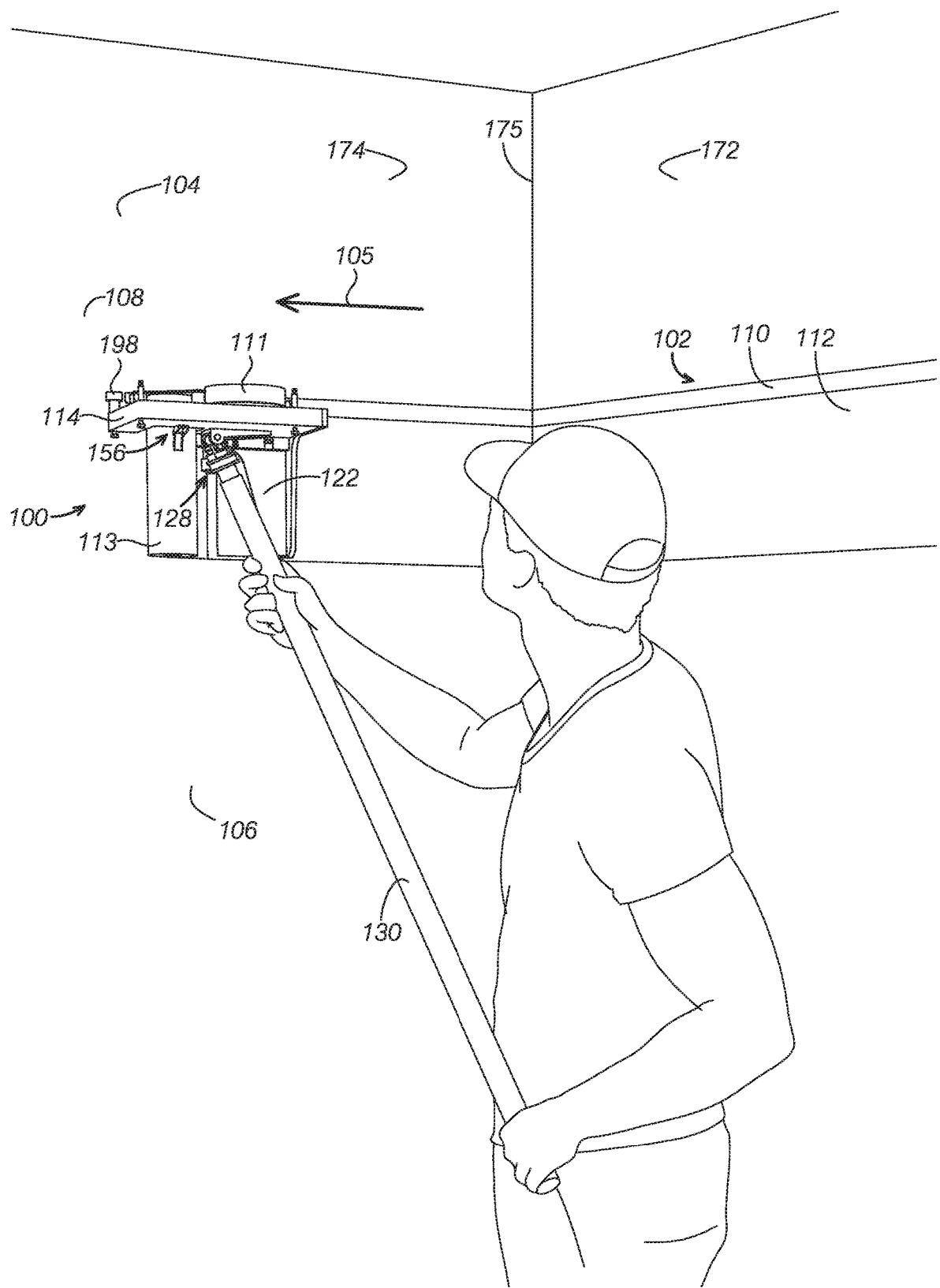
FIG. 1 is a perspective view of a user using an applicator for applying masking materials to a wall.

The disclosed applicators will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various applicators are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Applicators for Applying Masking Material

With reference to the figures, applicators for applying masking material to surfaces will now be described. The applicators discussed herein function to apply masking material to walls and other surfaces. The applicators may be referred to as masking material applicators, straight line applicators, or just applicators. The masking material serves to delineate areas to be painted a given color and areas to be protected from being painted the given color.

The applicators discussed below address many of the shortcomings existing with conventional masking material applicators. For example, the applicators significantly reduce the tedium and labor required to apply masking material to walls and other surfaces as part of a pre-painting masking process. The present applicators include a variety of ergonomic features enabling a user to apply masking material to high and low levels without needing to climb a ladder, to use stilts, to bend over, or to get on his or her hands and knees.

Further, the currently described applicators apply masking material much faster and more accurately than conventional devices that apply masking material. Whereas conventional devices often apply masking material unevenly and inconsistently, the present applicators apply masking material in a precise, level line. The speed of application is also significantly faster than existing solutions.

The present applicators effectively manage corners in contrast to conventional masking material applicators. With existing applicators, one must often terminate the masking material application process when a corner is reached. However, with the applicators described below, one can transition to applying masking material to adjacent walls without stopping and restarting the process, which is substantially more efficient and convenient.

Target Surface

With reference to FIG. 1, the features of target surface 104 will first be described to aid the discussion of the masking material applicators disclosed herein. As shown in FIG. 1, target surface 104 is a pair of adjacent walls meeting at a corner. In other examples, the target surface is a surface other than a wall, such as a ceiling, a floor, or an exterior surface of furniture, electronics, or a window.

As shown in FIG. 1, target surface 104 defines a first target surface 172 and a second target surface 174 extending transverse to first target surface 172. In the present example, the adjacent walls, target surfaces 172 and 174, meet at an interior corner 175 defining a concave angle between the walls. However, in other examples, the walls meet at exterior corners defining a convex angle between the walls. In the example shown in FIG. 1, the angle between the walls is approximately 90 degrees, but in other examples the walls meet at other angles.

FIG. 1 depicts an application direction 105, which indicates the direction in which the user is translating applicator 100 along target surface 104. As will be explained in more detail below, as the user moves the applicator in the application direction, masking material is applied to the target surface trailing the applicator.

The application direction may be changed as needed. For example, in situations where one desires to paint vertical bands with alternating colors, the application direction may go from the floor to the ceiling to define a left edge of one vertical band and the user may then shift the applicator to the right move it from ceiling to floor for the right edge of the vertical band.

The reader can see in FIG. 1 that target surface 104 includes a masked portion 106 and an unmasked portion 108. Masked portion 106 is the portion of target surface 104 to be masked with masking material 102 to avoid paint intended for unmasked portion 108 from being inadvertently applied to masked portion 106. Unmasked portion 108 is the portion of target surface 104 intended to be painted a given color or stain. As shown in FIG. 1, unmasked portion 108 is on an opposite side of masking material 102 than masked portion 106. Expressed another way, the line of masking material 102 divides target surface 104 into a masked portion 106 and an unmasked portion 108.

Masking Material

Masking material 102 includes an adhesive tape 110 and a masking sheet 112. Masking sheet 112 is configured to be held in place on target surface 104 by adhesive tape 110. Both adhesive tape 110 and masking sheet 112 function to cover or mask masked portion 106 of target surface 104. However, masking sheet 112 is often larger in size than adhesive tape 112, and thus, provides a larger area of masking than adhesive tape. The reader should understand that in some examples, the masking sheet may itself be a tape or include adhesive properties.

Adhesive tape 110 and masking sheet 112 may be any currently known or later developed material suitable for masking surfaces from paints, stains, and other potentially damaging materials or activities. A wide variety of adhesive tapes and masking sheets are currently known for masking applications and the applicators described herein are designed to work with all of them.

Adhesive tape 110 and masking sheet 112 are provided in roll form. In the present example, adhesive tape 110 and masking sheet 112 are provided as separate rolls, namely, adhesive tape roll 111 and masking sheet roll 113, respectively. In the present example, applicator 100 dispenses adhesive tape 110 from adhesive tape roll 111 and masking sheet 112 from masking sheet roll 113 in a manner that automatically adheres masking sheet 112 to adhesive tape 110 as adhesive tape 110 and masking sheet 112 are applied to target surface 104.

In other examples, the adhesive tape and the masking sheet are provided as a single roll, such as with a portion of the masking sheet already adhered to the adhesive tape or with just a masking sheet including an adhesive portion. In examples where the masking material is provided as a single roll, the applicator is configured to dispense the masking material from a single roll and to apply it to the target surface.

Applicator Embodiment One

With reference to FIGS. 1-10, a first example of an applicator for applying masking material 102, applicator 100, will now be described. Applicator 100 includes a body 114, an applicator system 180, a dispenser system 118, a guide member 122, a handle mechanism 128, a handle 130, a guide wheel mechanism 176, and a spacing wheel 198.

In some examples, the applicator does not include one or more features included in applicator 100. For example, some applicator examples do not include one or more of a handle mechanism, a handle, a guide wheel mechanism, and a spacing wheel.

In other examples, the applicator includes additional or alternative features. For example, some applicator examples include knifes, blades, or other cutting mechanisms for cutting through masking material to cut the masking material to a desired length. Some applicator examples include a skid plate configured to serve as a guide on ledges. In certain examples, a trailing press wheel is provided to press masking material to target surfaces by rolling over the masking material.

Body

As shown in FIGS. 1-9, body 114 includes a first side 134 and a second side 136 opposite first side 134 of body 114. The reader can see in FIGS. 2, 3, 8, and 9 that body 114 defines a dispenser opening 154 providing a passageway through body 114 between first side 134 and second side 136. First side 134 is distal a user manipulating applicator 100 and proximate unmasked portion 108 of target surface 104. In contrast, second side 136 is proximate a user manipulating applicator 100 and proximate masked portion 106 of target surface 104.

First side 134 supports features assisting a user to guide applicator 100 along target surface, such as guide wheel mechanism 176 and spacing wheel 198. First side 134 also supports features involved with applying masking material 102 to target surface 104, such as components of dispenser system 118.

Second side 136 supports features assisting a user to manipulate applicator 100, such as handle mechanism 128 and handle 130. However, second side 136 also supports features involved with applying masking material 102 to target surface 104, such as components of applicator system 180 and dispenser system 118.

Dispenser System

With reference to FIGS. 1-10, the reader can see that dispenser system 118 is attached to body 114 in a position to dispense masking material 102 to applicator system 180. In the present example, components of dispenser system 118 are attached to first side 134 and to second side 136 of body 114. Dispenser system 118 is configured to support a supply of masking material 102 and to dispense masking material 102 to applicator system 180. In the present example, the supply of masking material is adhesive tape roll 111 and masking sheet roll 113.

In the example shown in the figures, dispenser system 118 includes an adhesive tape axel 190 and a masking sheet axel 192. In the present example, adhesive tape axel 190 is mounted to body 114 on first side 134 of body 114. As shown in FIGS. 4, 6, 7, and 9, masking sheet axel 192 extends through dispenser opening 154 to support masking sheet roll 113 partially on first side 134 of body 114 and partially on second side 136 of body 114. Adhesive tape axel 190 is configured to support adhesive tape roll 111 and masking sheet axel 192 is configured to support masking sheet roll 113.

As shown in FIGS. 1, 3, 7, and 9, dispenser system 118 includes a brake mechanism 156 attached to body 114 proximate masking sheet axel 192. Brake mechanism 156 is configured to engage masking sheet roll 113 supported on masking sheet axel 192.

Brake mechanism 156 functions to limit rotation of masking sheet axel 192 to reduce dispensing more masking sheet than intended. It has been observed that the angular momentum of masking sheet roll 113 rotating on masking sheet axel 192 while dispensing masking sheet 112 can cause masking sheet roll 113 to continue rotating and dispensing masking sheet 112 after a user stops translating body 114 in application direction 105. Dispensing additional masking sheet material can result in bunched masking sheet applied to a wall as well as extra masking sheet material hanging from target surface 104 without being adhered to target surface 104 by adhesive tape 110. Brake mechanism 156 counteracts the angular momentum of masking sheet roll 113 and restricts masking sheet roll 113 from dispensing more masking sheet 112 than intended.

In the present example, brake mechanism 156 includes a base 158, an arm 160, and a brake bias mechanism 162. Base 158 is attached to body 114 proximate to masking sheet axel 192. Arm 160 is pivotally mounted to a base 158 and abuts or engages masking sheet roll 113 mounted on masking sheet axel 192. Brake bias mechanism 162 includes a spring biasing arm 160 towards masking sheet roll 113 to maintain arm 160 abutting masking sheet roll 113. Bias mechanism 162 is configured to increasingly limit rotation of masking sheet axel 192 as the diameter of masking sheet roll 113 mounted on masking sheet axel 192 increases. The angular momentum of masking sheet roll 113 increases as its diameter, and therefore its mass, increases; thus, expressed another way, bias mechanism 162 is configured to increasingly limit rotation of masking sheet roll 113 as its angular momentum increases.

In other examples, the dispenser system is configured differently, such as including a single axel when a single roll of masking material is provided. For example, a single roll of masking material may include both adhesive tape and masking sheet portions or may be entirely adhesive tape used to mask the target surface.

Applicator System

As shown in FIGS. 2, 3, and 6-9, applicator system 180 is attached to body 114 in a position proximate to target surface 104. Applicator system 180 is configured to apply masking material 102 to target surface 104 with a substantially straight edge as body 114 is translated in application direction 105.

The reader can see in FIGS. 2-4 and 6-9 that applicator system 180 includes an adhesive tape applicator wheel 150 and a masking sheet applicator wheel 152. In some examples, the applicator system includes only an applicator wheel without a masking sheet applicator wheel. In other examples, the applicator system includes additional components, such as guides to assist receiving masking material from the dispenser system or additional applicator wheels or members to assist applying masking material to the target surface.

As shown in FIGS. 2 and 6-8, adhesive tape applicator wheel 150 is supported on first side 134 of body 114 proximate guide member 122. Adhesive tape applicator wheel 150 is configured to receive adhesive tape 110 from adhesive tape roll 111 supported on adhesive tape axel 190. Adhesive tape applicator wheel 150 is further configured to apply adhesive tape 110 to target surface 104 by pressing adhesive tape 110 against target surface 104.

In the present example, the size of adhesive tape applicator wheel 150 is selected based on the size of adhesive tape 110 to cause adhesive tape 110 to extend past adhesive tape applicator wheel 150 as adhesive tape applicator wheel 150 applies adhesive tape 110 to target surface 104. Adhesive tape 110 extending past adhesive tape applicator wheel 150 helps avoid adhesive tape applicator wheel 150 contacting target surface 104 as it applies adhesive tape 110 to target surface 104, which could possibly damage or mar target surface 104.

To cause adhesive tape 110 to extend past adhesive tape applicator wheel 150, the height of adhesive tape applicator wheel 150 is smaller than the height of adhesive tape 110. The height of adhesive tape applicator wheel 150 is the dimension parallel to the rotation axis of adhesive tape applicator wheel 150. The height of adhesive tape 110 is the dimension parallel to the rotation axis of adhesive tape roll 111 on adhesive tape axel 190.

As shown in FIGS. 3, 6, 7, and 9, masking sheet applicator wheel 152 is supported on second side 136 of body 114 proximate guide member 122. Masking sheet applicator wheel 152 is configured to guide masking sheet 112 dispensed from dispenser system 118. In particular masking sheet applicator wheel 152 is configured to guide masking sheet 112 approaching guide member 122 as body 114 translates along application direction 105.

Masking sheet applicator wheel 152 is spaced farther from target surface 104 than adhesive tape applicator wheel 150 is spaced from target surface 104. The spacing difference between masking sheet applicator wheel 152 and adhesive tape applicator wheel 150 from target surface 104 is selected to cause adhesive tape applicator wheel 150 to apply more pressure to adhesive tape 110 than masking sheet applicator wheel 150 applies to masking sheet 112.

The reader can see in the figures and from the discussion above that adhesive tape axel 190, masking sheet axel 192, masking sheet applicator wheel 152, and adhesive tape applicator wheel 150 cooperate to adhere masking sheet 112 to adhesive tape 110 as the dispensing system dispenses masking material 102 to applicator system 180. Adhesive tape 110 holds masking sheet 112 on target surface 104 after adhesive tape 110 applicator applies adhesive tape 110 to target surface 104. Automatically combining adhesive tape 110 with masking sheet 112 and applying the combined masking material 102 to target surface 104 greatly improves the masking process.

Guide Member

As shown in FIGS. 1-10, guide member 122 is attached to body 114 proximate applicator system 180. Guide member 122 is supported by body 114 in a trailing position following applicator system 180 as body 114 is translated in application direction 105. Thus, guide member 122 acts on masking material 102 after applicator system 180 applies masking material 102 to target surface 104.

In the present example, guide member 122 is planar and includes a guide surface 126, a leading end 166, a trailing end 164, an unmasked end 168, and a masked end 170. Guide surface 126 is a major face of guide member 122 and faces target surface 104. Leading end 166 is distal applicator system 180 and farther along application direction 105 than trailing end 164, which is proximate applicator system 180. Unmasked end 168 is proximate unmasked portion 108 of target surface 104 when applicator 100 is applying masking material 102. Masked end 170 is opposite unmasked end 168 and distal unmasked portion 108 of target surface 104 when applicator 100 is applying masking material 102.

Guide surface 126 is configured to press adhesive tape 110 of masking material 102 against target surface 104 after applicator system 180 applies masking material 102 to target surface 104. Guide surface 126 is further configured to press masking sheet 112 against target surface 104 after applicator system 180 applies masking material 102 to target surface 104.

In the example shown in FIGS. 1-10, guide surface 126 is configured to press adhesive tape 110 against target surface 104 with more force than it presses masking sheet 112. Pressing adhesive tape 110 with more force helps to facilitate adhesive tape 110 adhering to target surface 104. Pressing masking sheet 112 with less force helps smooth out any wrinkles in masking sheet 112 and to orient or guide it to lie flat on target surface 104.

To press adhesive tape 110 against target surface 104 with more force than it presses masking sheet 112, guide surface 126 is tapered from unmasked end 168 to masked end 170. The taper places unmasked end 168 closer to target surface 104 than masked end 170. Unmasked end 168 being closer to target surface 104 than masked end 170 causes guide member 122 to apply more pressure to adhesive tape 110 than to masking sheet 112.

In the present example, guide surface 126 is also tapered to be closer to target surface 104 proximate trailing end 164 of guide member 122 than proximate leading end 166. Trailing end 164 being closer to target surface 104 functions to increase the compressive force applied to masking material 102 by guide member 122 proximate trailing end 164 as body 114 is translated in application direction 105. Applying more compressive force proximate trailing end 164 may help avoid masking material 102 getting caught or bunched up between applicator system 180 and guide member 122. Additionally or alternatively, applying more compressive force proximate trailing end 164 may help smooth out masking material 102 flat against target surface 104.

Figure 2:
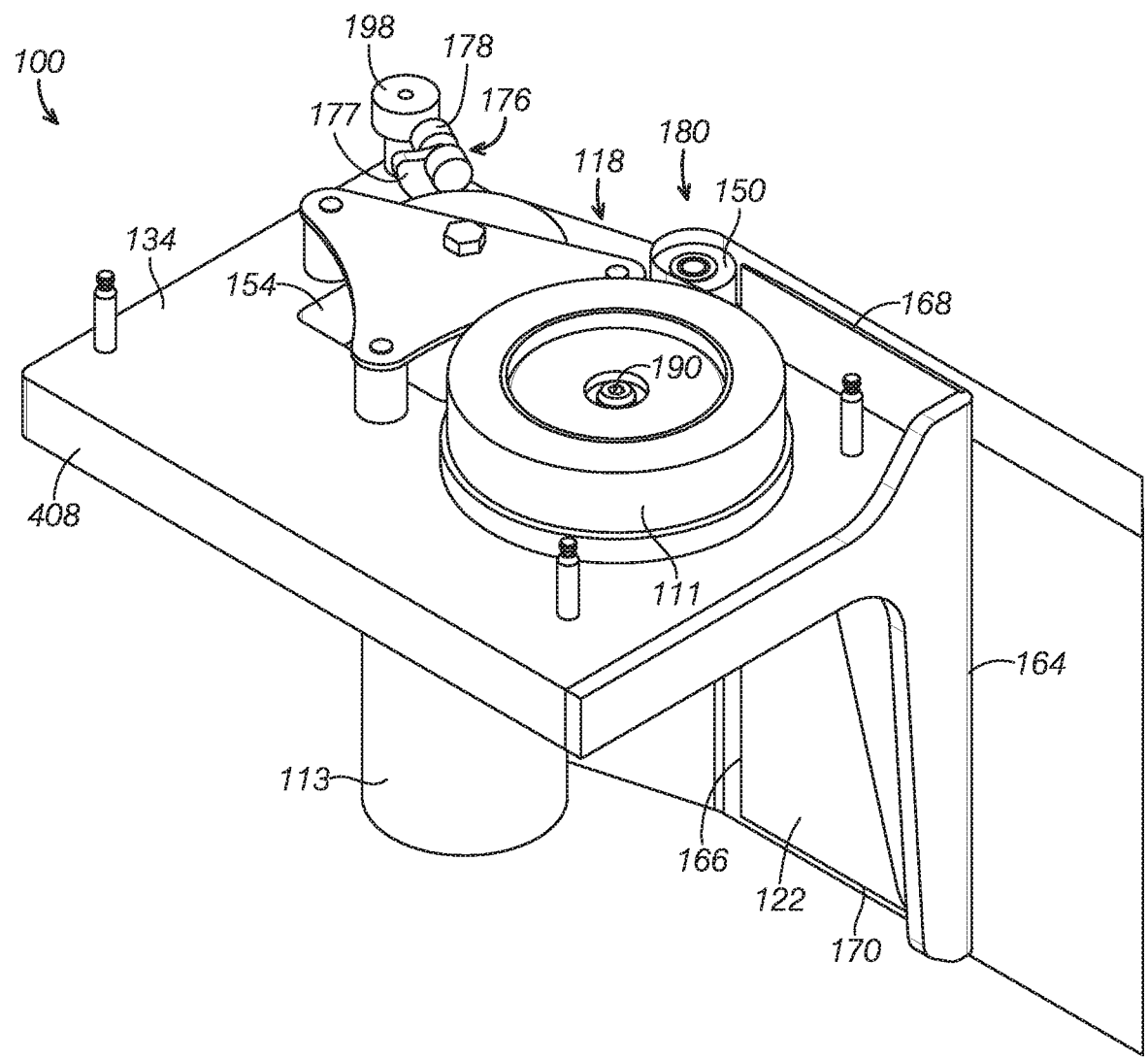
FIG. 2 is a perspective view of the applicator shown in FIG. 1, depicting an adhesive tape roll and a masking sheet roll supported on a body of the applicator.
Figure 3:
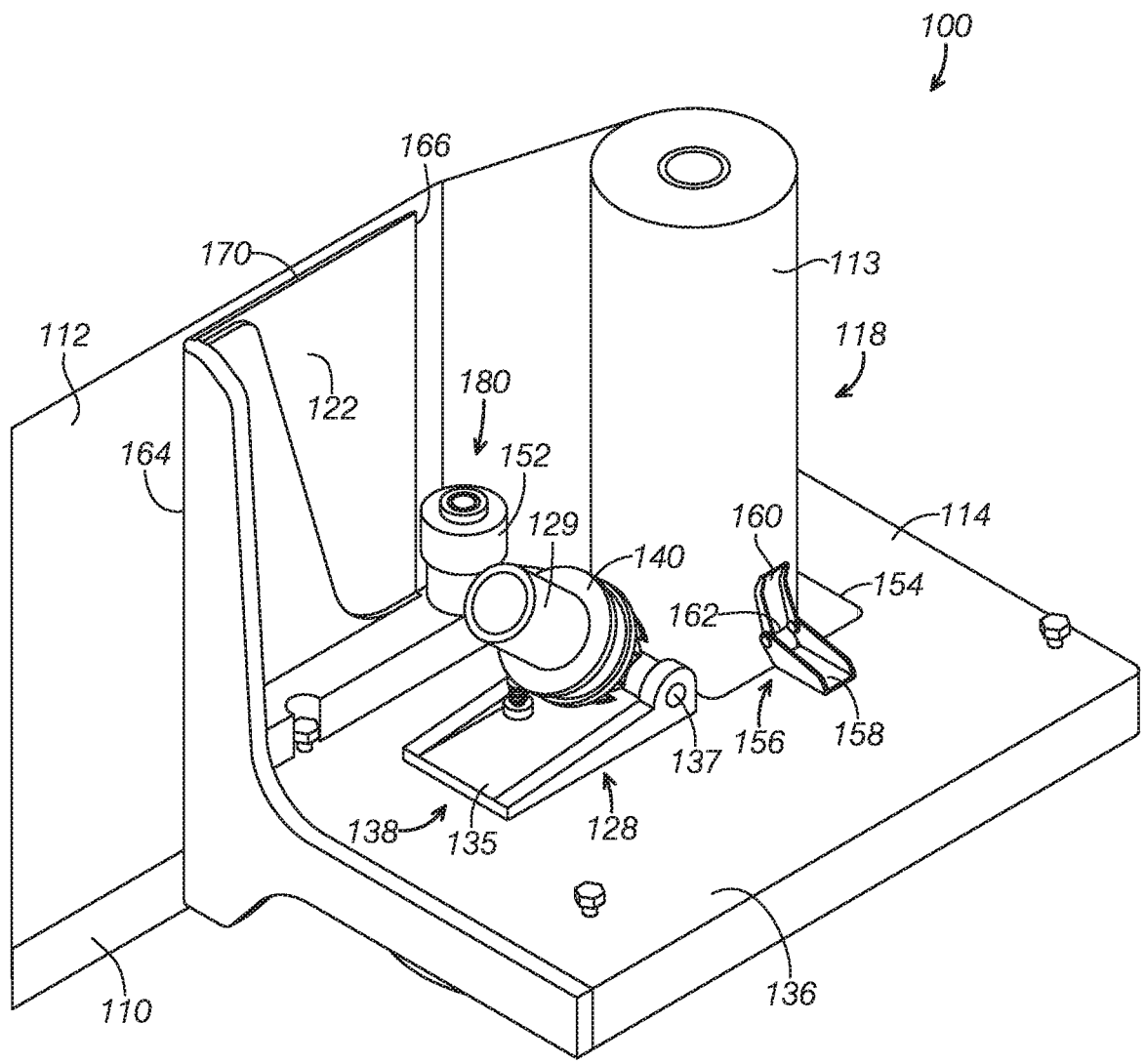
FIG. 3 is perspective view of the applicator shown in FIG. 1 depicting a second side of a body.
Figure 4:
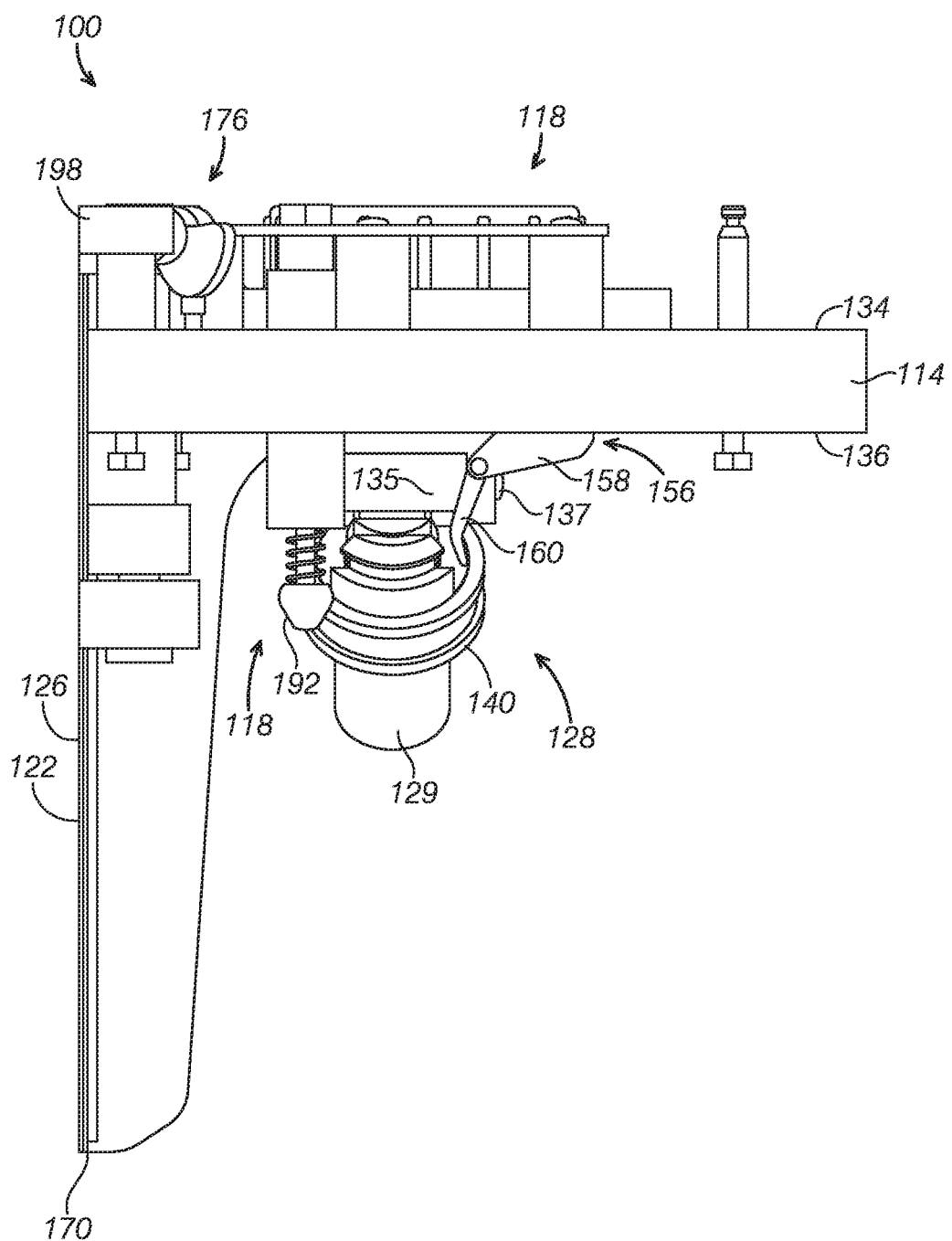
FIG. 4 is a front elevation view of the applicator shown in FIG. 1 depicting a leading edge of the applicator.
Figure 10:
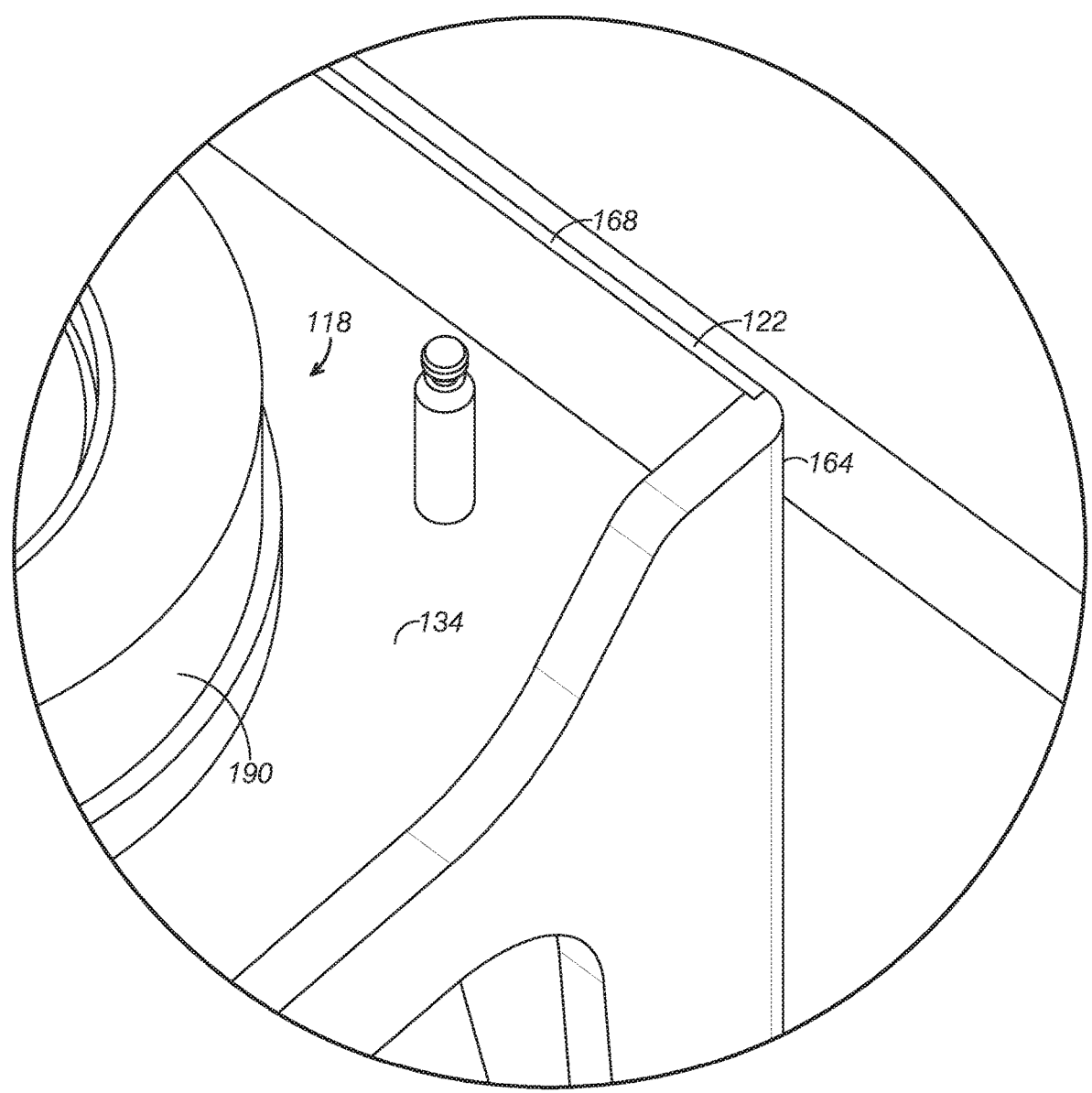
FIG. 10 is a close up view of a skid plate shown in FIG. 5 depicting a trailing edge of the skid plate being rounded where the skid plate presses the adhesive tape to the wall to facilitate applying adhesive tape around corners.

With reference to FIGS. 2, 3, and 10 in particular, the reader can see that trailing end 164 of guide member 122 is rounded. Rounding trailing end 164 facilitates applicator 100 transitioning from applying masking material 102 to first target surface 172 over to applying masking material 102 to second target surface 174 continuously. In other examples, the trailing end of the guide member is not rounded, but is flat or tapered.

Handle Mechanism

As shown in FIGS. 1, 3-5, 7, and 9, handle mechanism 128 is attached to second side 136 of body 114. Handle mechanism 128 functions to help a user manipulate body 114 with handle 130. In some examples, the handle is fixed to the handle mechanism, but in the present example, handle 130 is configured to selectively attach to and detach from handle mechanism 128.

In the present example, handle mechanism 128 includes a pivot mechanism 138 and a handle receptacle 129 attached to pivot mechanism 138. In other examples, the handle mechanism may incorporate any presently known or later developed mechanisms for supporting a handle, including mechanisms that provide pivoting functions and mechanisms that restrict pivoting.

Handle receptacle 129 is configured to releasably receive handle 130 via a threaded interface. In some examples, the handle receptacle releasably secures the handle through non-threaded interfaces, such as friction fits, magnetic interfaces, or detent mechanisms. In some examples, the handle is fixedly secured to the handle receptacle rather than releasably secured.

Pivot mechanism 138 enables body 114 to pivot relative to handle 130. Body 114 pivoting relative to handle 130 helps to orient body 114 flat against target surface 104. The ability of body 114 to pivot relative to handle 130 also helps to transition around corners from one target surface to an adjacent target surface.

Pivot mechanism 138 is configured to enable body 114 to pivot relative to handle 130 in a first axis and in a second axis transverse to the first axis. In the present example, the second axis is perpendicular to the first axis while in other examples transverse orientations other than perpendicular orientations are selected. In some examples, the pivot mechanism is configured to enable the body to pivot about a single axis or about three axes.

In the present example, the first axis extends perpendicular from target surface 104 to enable handle 130 to pivot in a plane parallel to target surface 104 when body 114 is flat against target surface 104. The second axis extends parallel to target surface 104 and parallel to application direction 105 to enable handle 130 to pivot towards and away from target surface 104 when body 114 is flat against target surface 104.

Pivot mechanism 138 includes a base member 135, a first pivot axel 137 supported on base member 135, and a second pivot axel 139 supported on first pivot axel 137. However, any currently known or later developed mechanism for enabling pivotal connections may be used instead of the specific configuration of pivot mechanism 138 described here. First pivot axel 137 extends along the first axis and second pivot axel 139 extends along the second axis.

Figure 5:
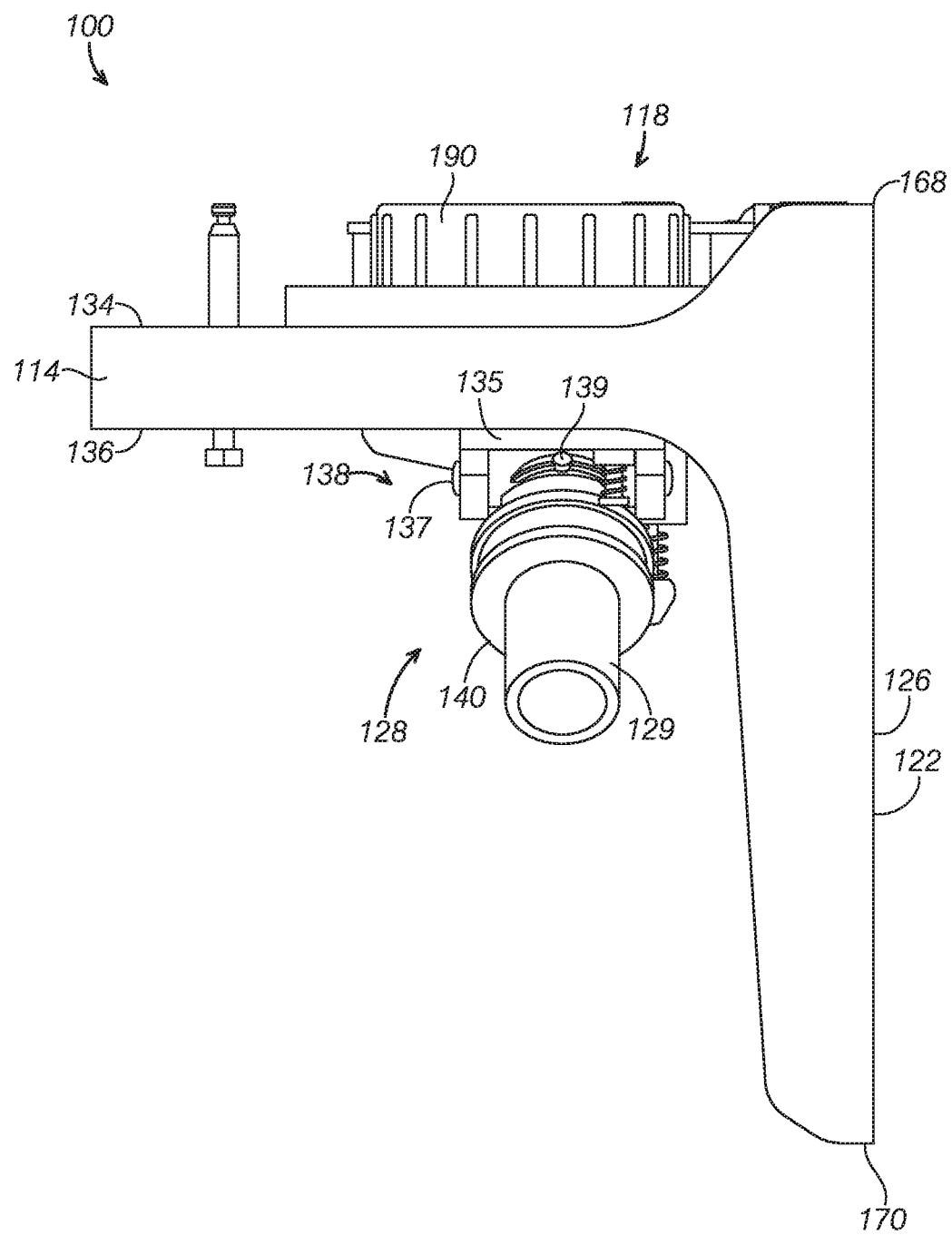
FIG. 5 is a rear elevation view of the applicator shown in FIG. 1 depicting a trailing edge of the applicator.
Figure 6:
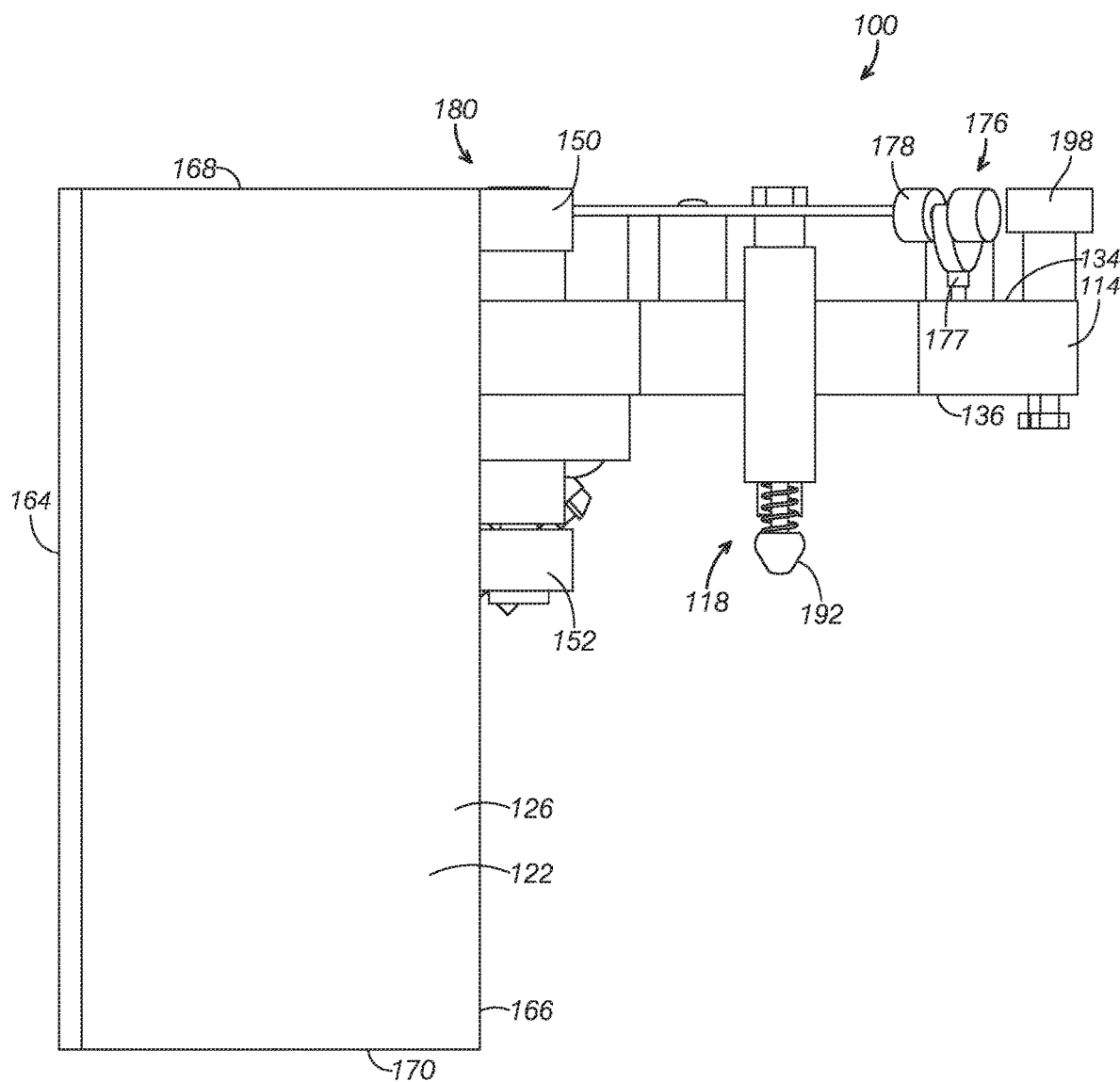
FIG. 6 is a side elevation view of the applicator shown in FIG. 1 depicting a wall-facing side of the applicator.
Figure 7:
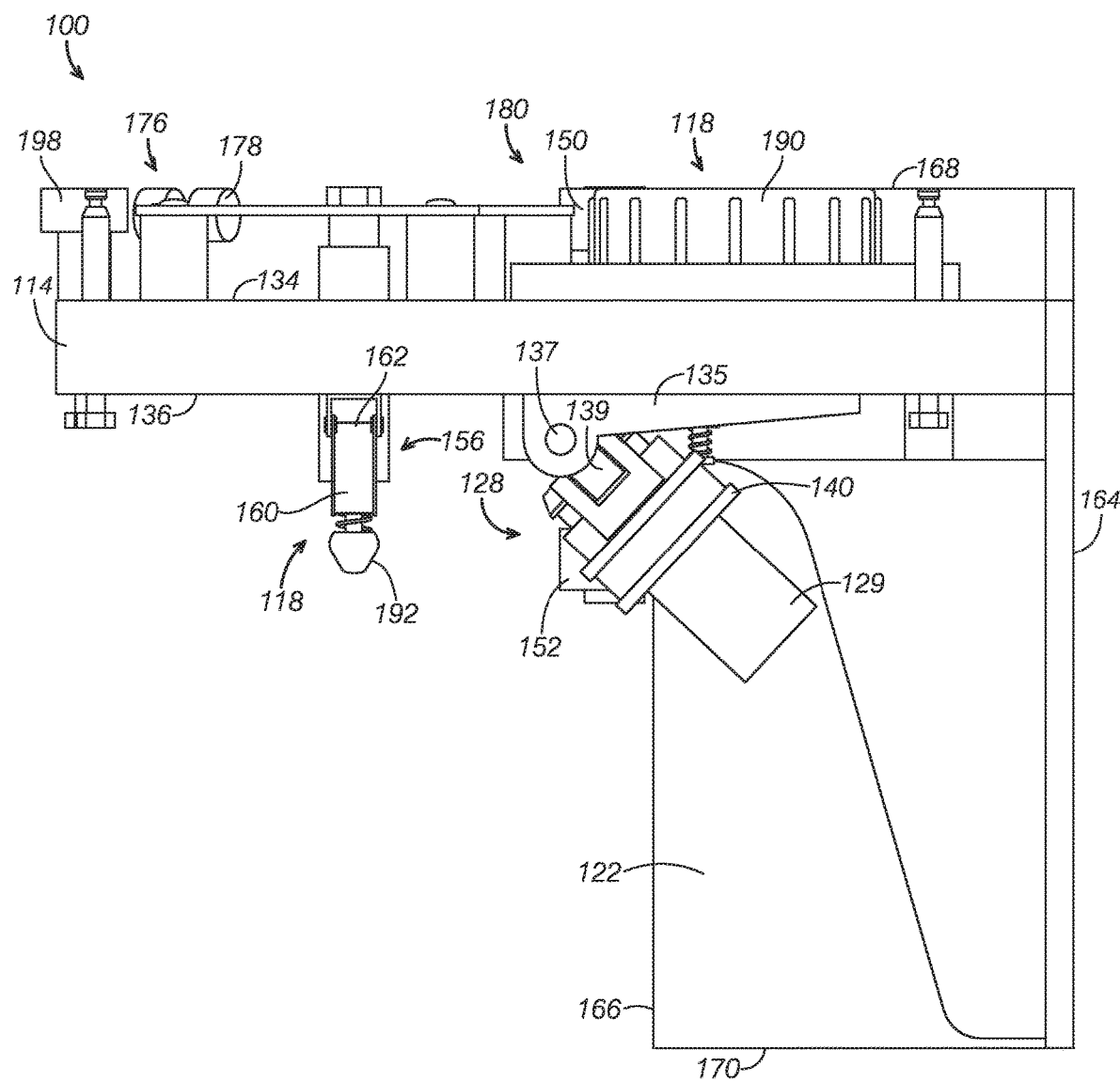
FIG. 7 is a side elevation view of the applicator shown in FIG. 1 opposite the wall-facing side of the applicator.
Figure 8:
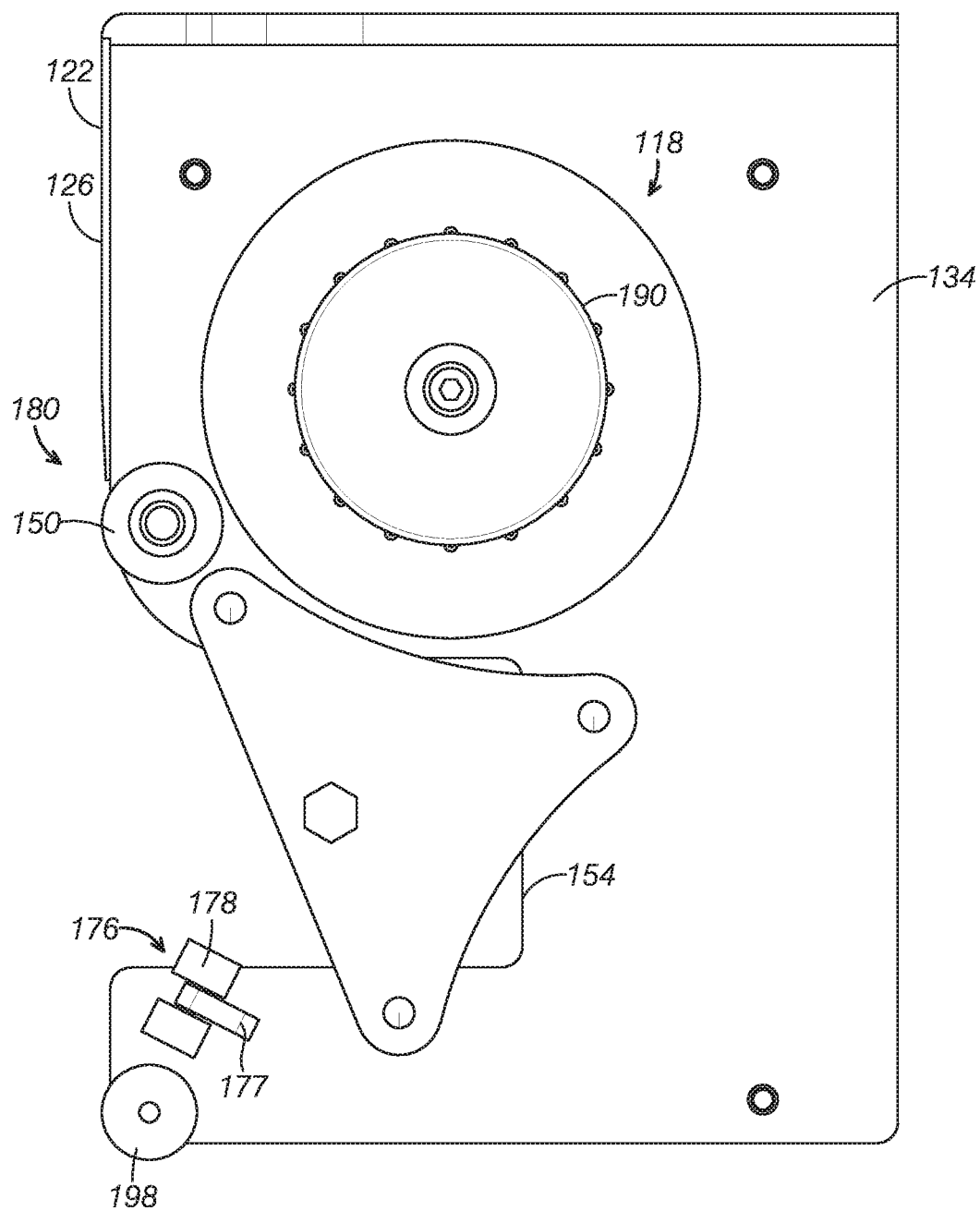
FIG. 8 is a top view of the applicator shown in FIG. 1.
Figure 9:
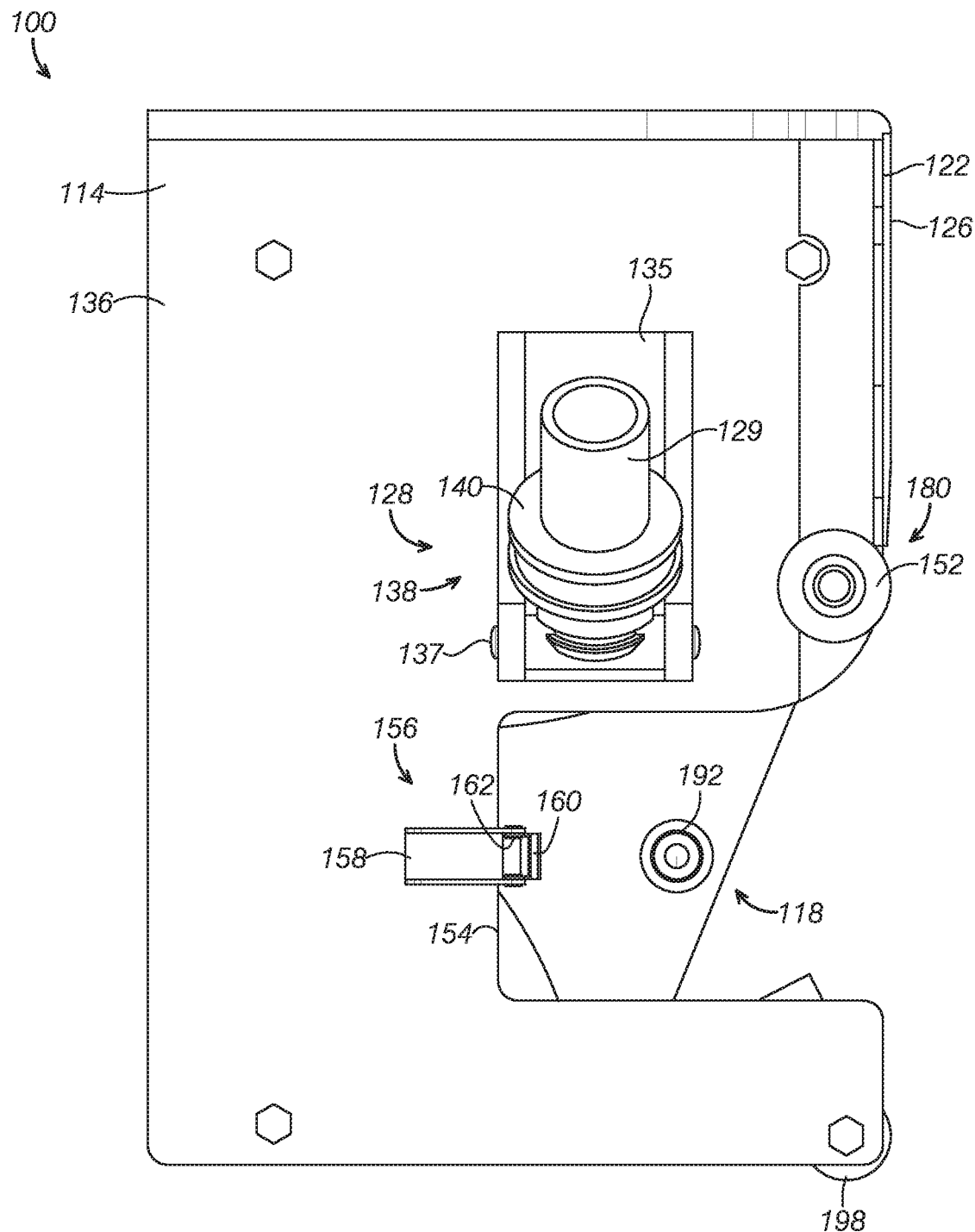
FIG. 9 is a bottom view of the applicator shown in FIG. 1.

As shown in FIGS. 5 and 7, handle receptacle 129 is supported on second pivot axel 139. When handle 130 is selectively attached to handle receptacle 129, handle 130 becomes operatively connected to pivot mechanism 138 and pivots relative to body 114 in the first and second axes. Base member 135 is attached to second side 136 of body 114. In some examples, the base member is attached to the second side of the body on a rail system enabling the base member, and therefore the entire pivot mechanism, to move relative to the body along the rail system.

To restrict the degree to which body 114 may pivot in the second axis, pivot mechanism 138 includes a stop member 140. In the present example, stop member 140 is a collar configured to abut first pivot axel 137. Stop member limits the degree to which body 114 may pivot in the second axis to avoid body 114 tilting in unhelpful ways.

For example, stop member 140 limits body 114 from pivoting in the second axis in a way that would bring the end of handle 130 held by a user too close to target surface 104. In particular, stop member 140 restrict handle 130 from moving closer to target surface 104 than approximately parallel to target surface 104 when body 114 is flat against target surface 104. Stop member 140 also restricts handle from moving more than approximately 135 degrees away from target surface 104 when body 114 is flat against target surface 104.

The stop member may be configured to restrict pivoting to any desired degree in either the first or the second axis. Additionally or alternatively, multiple stop members may be included to customize the degree of rotation in each axis and to different degrees in different pivot directions.

Handle

In the present example, handle 130 is a pole enabling a user to manipulate body 114 from a distance, such as in high places from the floor or in low places while standing upright. The length of the pole may be selected to suit a given application. In some examples, the length of the pole is adjustable, such as via telescoping extensions.

In other examples than shown in the figures, the handle is not an elongate pole configured to be held by a user at some distance from the body, but is instead a member meant to be grasped close to the body to enable the body to be manipulated with the user's hand close to the target surface. Pistol grips, round shaped grips, and grips with finger indents may all be used.

Guide Wheel Mechanism

As shown in FIGS. 2, 3, 6, and 7, guide wheel mechanism 176 is mounted to body 114 proximate target surface 104 and towards a leading edge of body 114. In some examples, the applicator includes no guide wheel mechanisms, a single guide wheel mechanism, or multiple guide wheel mechanisms. Guide wheel mechanism 176 functions to orient body 114 relative to target surface 104 as body moves in application direction 105.

Guide wheel mechanism 176 also functions to help body 114 transition between adjacent target surfaces around corners. With reference to FIG. 1, guide wheel mechanism 176 is configured to swivel a set of guide wheels 178 to transition from set of guide wheels 178 engaging first target surface 172 to set of guide wheels 178 engaging second target surface 174. In this manner, guide wheel mechanism 176 facilitates applicator 100 transitioning from applying masking material 102 to first target surface 172 to applying masking material 102 to second target surface 174.

In the present example, guide wheel mechanism 176 includes a swivel mechanism 177 and set of guide wheels 178. In other examples, the guide wheel mechanism does not include a swivel mechanism. In certain examples, the guide wheel mechanism includes a single guide wheel instead of a set of guide wheel.

Swivel mechanism 177 is attached to body 114 proximate a leading edge of body 114 and supports set of guide wheels 178 in a position spaced from body 114. Swivel mechanism 177 is configured to freely rotate or swivel about an axis parallel to target surface 104. In some examples, the swivel mechanism is restricted from rotating at all or beyond a selected angle. The swivel mechanism may be any currently known or later developed mechanism for rotationally mounting a mechanical component.

Each guide wheel in set of guide wheels 178 is configured to engage and roll along target surface 104 to assist body 114 translating along the application direction. In the present example, set of guide wheels 178 includes two guide wheels mounted on a common axel. In other examples, a single wheel is included or more than two wheels are included. In certain examples, one or more guide wheels in the set of guide wheels is mounted on a separate axis extending transverse to the other axis or axes.

Spacing Wheel

Spacing wheel 198 shown in FIGS. 1, 2, 4, and 6-9 functions to maintain a desired amount of space between target surface 104 and body 114 and other components of applicator 100. Spacing wheel 198 is configured to contact and roll freely along target surface 104. Any suitable wheel or spacing mechanism currently known or later developed may be used. Some examples of the applicator do not include the spacing wheel while other examples include more than one spacing wheel.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An applicator for applying a masking material to a target surface while translating in an application direction along the target surface, the target surface including a masked portion to be masked with the masking material and an unmasked portion on an opposite side of the masking material than the masked portion, the masking material comprising an adhesive tape and a masking sheet configured to be held in place on the target surface by the adhesive tape, the applicator comprising:
   a body;
   an applicator system attached to the body and configured to apply the masking material to the target surface with a substantially straight edge as the body is translated in the application direction;
   a dispenser system attached to the body, the dispenser system being configured to support a supply of the masking material and to dispense the masking material to the applicator system; and
   a guide member attached to the body in a trailing position following the applicator system as the body is translated in the application direction, the guide member including a guide surface facing the target surface, the guide surface configured to press the adhesive tape of the masking material against the target surface after the applicator system applies the masking material to the target surface;
   a handle mechanism attached to the body, the handle mechanism configured to receive a handle for manipulating, the body; and
   a pivot mechanism to enable the body and the handle mechanism to pivot relative to the handle
   wherein the pivot mechanism is configured to enable the body to pivot relative to the handle in a first axis and in a second axis transverse to the first axis.

2. The applicator of claim 1, wherein the handle is a pole.

3. The applicator of claim 1, wherein the body includes:
   a first side facing the unmasked portion of the target surface; and
   a second side facing the masked portion of the target surface and opposite the first side of the body; and
   the handle mechanism is attached to the second side of the body.

4. The applicator of claim 1, wherein the pivot mechanism includes a stop member to restrict the degree to which the body may pivot in the second axis.

5. The applicator of claim 1, further comprising a guide wheel mechanism mounted to the body facing the target surface, the guide wheel mechanism including a guide wheel configured to engage and roll along the target surface to assist the body translating along the application direction.

6. The applicator of claim 5, wherein:
   the target surface defines a first target surface;
   a second target surface extends transverse to the first target surface;
   the guide wheel mechanism includes a swivel mechanism configured to swivel the guide wheel; and
   the guide wheel mechanism is configured to swivel the guide wheel to transition from the guide wheel engaging the first target surface to the guide wheel engaging the second target surface to facilitate the applicator transitioning from applying the masking material to the first target surface to applying the masking material to the second target surface.

7. An applicator for applying a masking material to a target surface while translating in an application direction along the target surface, the target surface including a masked portion to be masked with the masking material and an unmasked portion on an opposite side of the masking material than the masked portion, the masking material comprising an adhesive tape and masking sheet configured to be held in place on the target surface by the adhesive tape, the applicator comprising:
   a body;
   an applicator system attached to the body and configured to apply the masking material to the target surface with a substantially straight edge as the body is translated in the application direction;
   a dispenser system attached to the body, the dispenser system being configured to support a supply of the masking material and to dispense the masking material to the applicator system; and
   a guide member attached to the body in a trailing position following the applicator system as the body is translated in the application direction, the guide member including a guide surface facing the target surface, the guide surface configured to press the adhesive tape of the masking material against the target surface after the applicator system applies the masking material to the target surface;
   a handle mechanism attached to the body, the handle mechanism configured to receive a handle for manipulating the body; and
   a pivot mechanism to enable the body and the handle mechanism to pivot relative to the handle;
   wherein:
      the adhesive tape is provided as an adhesive tape roll;
      the masking sheet is provided as a masking sheet roll distinct from the adhesive tape roll;
      the dispenser system includes:
         an adhesive tape axle configured to support the adhesive tape roll and
         a masking sheet axle configured to support the masking sheet roll;
      the applicator system includes an adhesive tape applicator wheel adjacent to the guide member, the adhesive tape applicator wheel being configured to receive the adhesive tape from the adhesive tape roll supported on the adhesive tape axle and to apply the adhesive tape to the target surface; and
      the adhesive tape axle, the masking sheet axle, and the adhesive tape applicator wheel cooperate to adhere the masking sheet to the adhesive tape as the dispensing system dispenses the masking material to the applicator system and the adhesive tape holds the masking sheet on the target surface after the adhesive tape applicator applies the adhesive tape to the target surface.

8. The applicator of claim 7, wherein the applicator system includes a masking sheet applicator wheel adjacent to the guide member, the masking sheet applicator wheel being configured to guide the masking sheet as it approaches the guide member as the body translates along the application direction.

9. The applicator of claim 8, wherein the masking sheet applicator wheel is spaced farther from the target surface than they adhesive tape applicator wheel is spaced from the target surface to cause the adhesive tape applicator wheel to apply more pressure to the adhesive tape than the masking sheet applicator wheel applies to the masking sheet.

10. The applicator of claim 7, wherein:
the body includes:
  a first side facing the unmasked portion of the target surface; and
  a second side facing the masked portion of the target surface; and
the adhesive tape axle and the adhesive tape applicator wheel are mounted to the body on the first side of the body.

11. The applicator of claim 10, wherein:
the body defines a dispenser opening; and
the masking sheet axle extends through the dispenser opening to support the masking sheet roll partially on the first side of the body and partially on the second side of the body.

12. The applicator of claim 7, wherein the dispenser system includes a brake mechanism attached to the body adjacent to the masking sheet axle, the brake mechanism configured to engage the masking sheet roll supported on the masking sheet axle to limit rotation of the masking sheet axle.

13. The applicator of claim 12, wherein the brake mechanism includes:
a base mounted to the body;
an arm mounted to the base and configured to engage the masking sheet roll supported on the masking sheet axle; and
a bias mechanism biasing the arm towards the masking sheet roll supported on the masking sheet axle.

14. The applicator of claim 13, wherein the bias mechanism is configured to increasingly limit rotation of the masking sheet axle as the diameter of the masking sheet roll mounted on the masking sheet axle increases.

15. An applicator for applying a masking material to a target surface while translating in an application direction along the target surface, the target surface including a masked portion to be masked with the masking material and an unmasked portion on an opposite side of the masking material than the masked portion, the masking material comprising an adhesive tape and a masking sheet configured to be held in place on the target surface by the adhesive tape, the applicator comprising:

a body;
an applicator system attached to the body and configured to apply the masking material to the target surface with a substantially straight edge as the body is translated in the application direction;
a dispenser system attached to the body, the dispenser system being configured to support a supply of the masking material and to dispense the masking material to the applicator system; and
a guide member attached to the body in a trailing position following the applicator system as the body is translated in the application direction, the guide member including a guide surface facing the target surface, the guide surface configured to press the adhesive tape of the masking material against the target surface after the applicator system applies the masking material to the target surface;
a handle mechanism attached to the body, the handle mechanism configured to receive a handle for manipulating the body; and
a pivot mechanism to enable the body and the handle mechanism to pivot relative to the handle;
wherein the guide surface is tapered to be closer to the target surface at a trailing end of the guide member than at a leading end of the guide member opposite the trailing end to increase the compressive force applied to the masking material by the guide member proximate the trailing end as the body is translated in the application direction.

16. The applicator of claim 15, wherein:
the guide member includes an unmasked end adjacent to the unmasked portion of the target surface;
the guide member includes a masked end opposite the unmasked end and adjacent to the masked portion of the target surface;
the guide surface is tapered from the unmasked end to the masked end such that the unmasked end is closer to the target surface than the masked end to cause the guide member to apply more pressure to the adhesive tape than to the masking sheet.

17. The applicator of claim 15, wherein:
the target surface defines a First target surface;
a second target surface extends transverse to the first target surface;
the trailing end of the guide member is rounded to facilitate the applicator transitioning from applying the masking material to the first target surface to applyin the masking material to the second target surface.

* * * * *